United States Patent [19]

Logan et al.

[11] Patent Number: 4,501,177
[45] Date of Patent: Feb. 26, 1985

[54] EDGE TRIMMING AND SCRAP DISPOSAL SYSTEM

[75] Inventors: Russell J. Logan, Pepper Pike; Arthur J. Glass, Newbury, both of Ohio

[73] Assignee: Kennecott Corporation, Cleveland, Ohio

[21] Appl. No.: 436,857

[22] Filed: Oct. 26, 1982

[51] Int. Cl.³ .............................................. B23D 19/06
[52] U.S. Cl. ........................................ 83/105; 83/165; 83/430; 83/503
[58] Field of Search ................ 83/105, 302, 408, 430, 83/441, 446, 449, 500–503, 923, 165

[56] References Cited

U.S. PATENT DOCUMENTS

| | | | |
|---|---|---|---|
| 108,013 | 10/1870 | Evans | 409/138 |
| 560,231 | 5/1896 | Riggs | 83/500 X |
| 797,886 | 8/1905 | Deely | 83/346 X |
| 1,292,157 | 1/1919 | Townsend | 409/138 |
| 2,014,248 | 9/1935 | Evans | 83/430 X |
| 2,025,418 | 12/1935 | Moore | 83/923 X |
| 2,084,967 | 6/1937 | Babb | 83/105 |
| 2,133,595 | 10/1938 | Thomas | 83/923 X |
| 2,160,999 | 6/1939 | Yoder | 83/105 |
| 2,203,738 | 6/1940 | Nash | 83/923 X |
| 2,208,022 | 7/1940 | Dworchuck | 83/105 |
| 2,242,887 | 5/1941 | Holdgate et al. | 83/923 X |
| 2,251,312 | 8/1941 | Yoder | 83/923 X |
| 2,397,603 | 4/1946 | Hackett | 83/923 X |
| 2,500,772 | 3/1950 | Reed | 83/105 |
| 2,706,001 | 4/1955 | Wilder | 83/105 |
| 2,708,480 | 5/1955 | Engel . | |
| 2,785,749 | 3/1957 | Wilson et al. | 83/430 X |
| 2,788,853 | 4/1957 | Wurm et al. | 83/105 |
| 3,069,949 | 12/1962 | Cooley | 83/923 X |
| 3,257,887 | 6/1966 | Jones | 83/503 |
| 3,257,906 | 6/1966 | Melville et al. | 409/138 |
| 3,364,803 | 1/1968 | Senftleben | 83/503 |
| 3,377,687 | 4/1968 | De Chellis | 83/923 X |
| 3,377,896 | 4/1968 | de Corta | 83/3 |
| 3,415,148 | 12/1968 | O'Brien | 83/923 X |
| 3,426,634 | 2/1969 | Richel | 83/923 X |
| 3,448,684 | 6/1969 | Cardinet et al. | 100/171 |
| 3,491,642 | 1/1970 | Weyant | 83/503 |
| 3,538,812 | 11/1970 | Morel . | |
| 3,602,095 | 8/1971 | Bocharov et al. | 90/24 F |
| 3,760,670 | 9/1973 | Poran | 83/102 |
| 3,768,101 | 10/1973 | Kuts | 83/408 |
| 3,799,020 | 3/1974 | Hoelmer | 83/923 X |
| 4,150,594 | 4/1979 | Pearson et al. | 83/91 |
| 4,224,850 | 9/1980 | Holmi et al. | 83/105 |
| 4,242,934 | 1/1981 | Coburn | 83/102 X |
| 4,245,534 | 1/1981 | Van Cleave | 83/500 |

FOREIGN PATENT DOCUMENTS 614966  1/1961  Italy .............................. 83/446

Primary Examiner—James M. Meister
Attorney, Agent, or Firm—R. Lawrence Sahr

[57] ABSTRACT

A system for trimming the edges of a metal strip and chopping the trimmed metal into small pieces. The system includes an automatic twin-edge trimmer, two chutes fastened to the trimmer and a scrap chopper. The twin-edge trimmer comprises two sets of coacting rotary slitter knives, one set for each edge of the strip and a backup roll adjacent to each knife in order to hold the strip flat while the cuts are being made. There are two mirror image chutes, each of which receives trimmings from one edge of the strip. Each chute is shaped and fastened to the trimmer in such a way that it completely surrounds the trim cut by the edge trimmer. The chutes are inclined downwardly at an angle with respect to the plane of the strip that matches that of the trimmings. The scrap chopper receives trim from both chutes and cuts the trim into small pieces. One edge trimmer is mounted for lateral movement with respect to the strip during trimming to provide an "on-the-fly" adjustment in the width of the strip thus trimmed.

13 Claims, 4 Drawing Figures

EDGE TRIMMING AND SCRAP DISPOSAL SYSTEM

BACKGROUND OF THE INVENTION

The invention relates to an edge trimming system and more particularly to a system for trimming, transporting and chopping scrap from the edge of strip metal.

In a system for manufacturing continuous metal strip, it is important to trim the edges of such strip so that they are clean, burr-free and the strip has a uniform, accurately controlled width. In order to do this, all slack must be taken out of the strip being fed to the edge trimmer system, but the drag or breaking force creating the tension cannot be so great as to hold the material back from free movement through the system. Also, the strip must remain precisely aligned as it passes through the trimmer.

There are many known systems for trimming and chopping scrap from the edges of strip metal. In a majority of these systems, it is difficult to get a precise, burr-free cut because the strip is not securely braced while it is being cut. A few systems concentrate on securing the strip, but there are still problems associated with these securing means. For example, U.S. Pat. No. 2,397,603 discloses the use of a hold-down disk employed to engage the upper surface of the sheet in order to stabilize it. The disk, however, is located inwardly from the cutting blade and therefore the sheet is not stabilized at the point of the cutting. The result is an edge with a burr.

It is very desirable to keep the cutting process moving at an even pace so as to avoid having to shut down the system. Examples of problems which cause the system to be shut down are if the trimmed metal gets tangled in the blades of the edge trimmer or if the trimmed metal escapes before reaching the scrap chopper in which case it must be rethread into a disposal chute.

Several solutions in common use focus on the problem of conducting the cut metal trim away from the blades in order to avoid having to shut down the system. U.S. Pat. No. 2,084,967 discloses the use of a tubular chute inclined downwardly to pass metal trim from an edge trimmer to a scrap chopper. The tubular chute has a rectangular section which receives the scrap. The use of such a rectangular section to receive scrap, however, does not eliminate the problem of scrap catching on an edge of the chute thereby jamminng the chute, nor does such a shape necessarily avoid the problem of scrap "escaping" from the chute. Heretofore, known edge trim disposal systems have not proven to be reliably self-threading when there is a break in the edge trim. Also, no known edge trimmer of this type for metallic strip products has been able to vary the width of the trimmed strip "on the fly".

It is a principal object of the present invention to provide a system for trimming the edges of a moving metal strip that produces a trimmed strip having a very uniform, precise width that can be varied "on the fly".

Another object of the invention is to provide an edge trimming and scrap disposal system where the trimmed edge is self-threading to the scrap disposal system despite breaks in the trimmed edge due to variations in the width of the strip or defects in the strip.

It is a further object of this invention to provide such a system in which the metal strips are trimmed in such a way that the slit edges of the strip have very little burr, even when the metal cut is a soft metal.

It is a still further object of this invention to provide such a system in which adjustments for burr control and for strip width can be made on the fly without shutting down the system.

It is yet a further object of this invention to provide such a system in which the edge trimmed scrap, which may be as narrow as the strip thickness, is chopped into short lengths reliably and automatically.

SUMMARY OF THE INVENTION

A system for trimming the edges of a moving metal strip and chopping the scrap trimmed from the edges including a twin-edge trimming mechanism, a pair of scrap chutes and a scrap chopper.

The twin-edge trimmer has two mirror image coacting cutting assemblies, one for each edge of the strip. Each cutting assembly has two parallel rotary cutting knives, one positioned mainly below the strip to be cut and one positioned mainly above the strip to be cut. Adjacent to the cutting knife located mainly below the strip is a backup roll positioned on the side of the knife furthest from the center of the strip, the center of the strip being the median of the plane along which the strip travels. Adjacent to the cutting knife located mainly above the strip is a backup roll positioned on the side of the knife closest to the center of the strip. Each backup roll is mounted on the same central axis as its corresponding adjacent cutting knife. These backup rolls serve the purpose of holding the strip flat while the cuts are being made. The gap between the two cutting knives is adjustable in order to provide for varying strip width and also to maintain the precise dimension of the strip width during the trimming operation.

Two identical scrap chutes, each mounted adjacent to the exit end of one side of the twin-edge trimmer, conduct the metal trimmings from the twin-edge trimmer to the scrap chopper. These chutes are angled downwardly away from the plane of the strip. The angle of the chutes to the strip passline generally matches that of the trimmed edge, a recommended value being 15°-30°. The end of each chute adjacent the associated trimmer is configured to substantially surround and enclose the trimmed edge scrap. This design is self-threading. The chutes are circular in cross section throughout their length and they have a smooth interior surface.

The scrap chopper comprises two rollers which function to chop up metal which has been trimmed away from the edges by the twin-edge trimmer. The scrap strips are fed by the scrap chutes to a rotating roller which has a chopper knife mounted laterally along its face. Mounted adjacent to this chopper roller is another rotating idler roller. The scrap strips pass simultaneously between these rollers and are cut off in about 3" to 10" lengths every time the chopper knife strikes them.

The system includes an arrangement for adjusting one of the cutting assemblies during operation to vary the width of the trimmed strip. This adjustment mechanism includes a mounting for one of the cutting assemblies to vary its horizontal spacing with respect to the other cutting assembly. A pair of self-centering spring-loaded guide rolls located on opposite edges of said strip position the strip laterally. The system also includes mechanisms for changing the vertical and horizontal distance between the knives of a cutting assembly. A precise trimmed strip is produced largely as a result of the system's ability to accurately control the lateral position of the strip.

These and other objects and features of the invention will become apparent to those skilled in the art from the following detailed description which should be read in light of the accompanying drawings.

BRIEF DESCRIPTION OF THE DRAWINGS

FIG. 3 is a top plan view of the scrap chute at its point of contact with the twin-edge trimmer.

FIG. 4 is a side plan view of the scrap chute shown in FIG. 3.

DETAILED DESCRIPTION OF THE PREFERRED EMBODIMENTS

Figure 1:
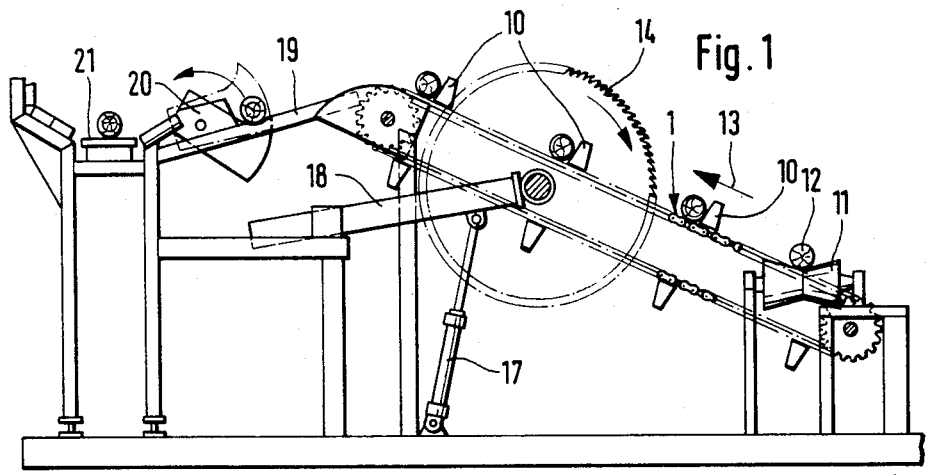
FIG. 1 is a highly simplified cross-sectional view of the entire scrap disposal system, not drawn to scale.

Referring to FIG. 1, the strip to be trimmed 12, approaches the edge trimmer under moderate tension. A pair of self centering spring-loaded guide rolls 14 on either side of the strip act to keep the strip centered in spite of its variable width at this point.

The edge trimmer has two coacting mirror image cutting assemblies, each assembly comprising a rotary cutting knife 18 with an adjacent backup roll (shown in FIGS. 2 and 4), and a knife (shown in FIGS. 2 and 4) with an adjacent backup roll 16. The rotary cutting knife 18 (shown in FIGS. 2 and 3) and its adjacent backup roll are driven by a hydraulic motor 44 through an overrunning clutch 46. The speed of the motor is measured by a tachometer 48.

These coacting cutting assemblies produce a trimmed strip 20, which has an accurate trimmed width. This strip is snugly held by grooved guide rolls 22 on each edge. These guide rolls are rigidly mounted to the knife supports and are in line with a point of cut. Thus, whenever the knives are moved to vary the trimmed strip width, the guides 22 also move the same amount, thus always maintaining snug contact with the trimmed edges. The system's ability to accurately control the lateral position of the strip is a key factor in the production of a precisely trimmed strip with burr-free edges.

The cut metal trim 24 enters a scrap chute 26 which conducts the metal to the scrap chopper rolls 28 and 30. A mirror image chute conducts the other trim to the same chopper rolls. The lower ends of the scrap chutes are spaced closely from the chopper rolls 28 and 30.

As the trim 24 is cut from the strip, it curls in a pigtail manner and forms an angle with respect to the plane of the strip. A significant feature of the present invention is that the chutes 26, 26 are inclined with respect to the plane of the strip at substantially the same angle. A typical value for this angle 32 is about 15° to 30°.

The chopper consists of two rolls. The upper idler roll 28, preferably made of hardened tool steel, is mounted on stiff anti-friction bearings and rotates only by friction from the scrap being cut. In operation, it tends to stop and start with every cut, unless line speed is very fast, in which case it will always be turning. The lower chopper roll 30, also mounted with stiff anti-friction bearings, has a cutting blade 34, preferably made of tungsten carbide or a similar material. A fine adjustment of the spacing of rolls 28 and 30 is used to create a clearance between the blade 34 and the idler roll 28 of about 0.001 inch without load. As progressively heavier scrap is cut, this clearance under load will increase somewhat.

The chopper roll 30 is driven by a hydraulic motor 36, the speed of which is measured by a tachometer 38. The blade 34 cuts the two edge trim pieces simultaneously into short pieces 40 about 3-10 inches long. A deflector 42 helps to deflect these pieces downwards, where they fall into a suitable container (not shown).

Figure 2:
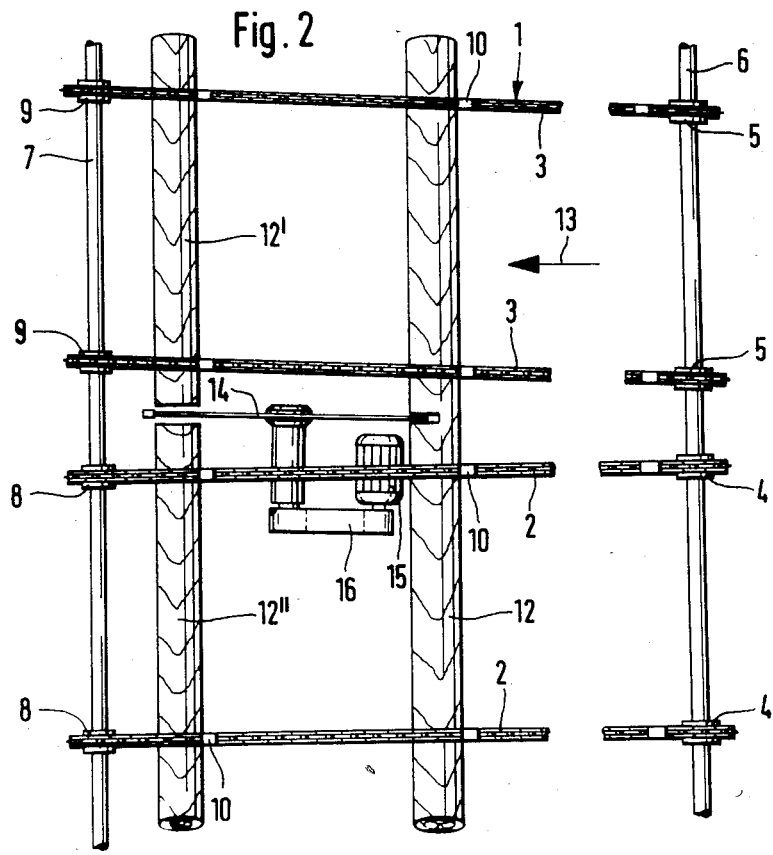
FIG. 2 is a view in vertical section of the knife-roller assembly of one side of the twin-edge trimmer.

FIG. 2 shows the cutting assembly for one side of the strip. The assembly for the other side of the strip is its mirror image. It is not necessary to have a hydraulic drive powering both cutting assemblies unless the strip is very thick. The hydraulic drive also assists in starting and threading a new strip. Cutting knives 18 and 60 are preferably made of cemented tungsten carbide. Backup rolls 16 and 62 are preferably made of hardened tool steel, optionally covered with hard rubber. These knives and backup rolls are ground to a flatness and thickness uniformity tolerance of less than 0.0001 inch and a diameter tolerance of about 0.001 inch. They are securely mounted on shoulder-shafts 64 and 66 with high-strength screws (not shown). The lower shaft 66 is supported in housing 68, where it rotates on pre-loaded precision anti-friction bearings, with a total run out of less than 0.0001 inches. The lower housing is bolted to a baseplate 70, mounted on linear bushings 72 riding on ground rod 74 supported by end locks 76, which are mounted securely to a large fixed base 78.

A fine-thread screw 80 is driven by a reversible gear motor 82. The rotation of the screw 80 moves the base 70 and the cutting assembly toward or away from the strip centerline, thereby changing the width of the trimmed strip 20. A position transducer 84 accurately measures the position of the base 70. The gear motor 82 may be used to change the width of the strip 20, regardless of whether the system is in operation. In other words, this adjusting mechanism allows an "on the fly" adjustment of the width of the trimmed strip.

The horizontal clearance between knife 60 and knife 18 may be varied by precision screws 86 which are turned by a calibrated dial handle 88. This horizontal clearance adjustment, which may be made with the strip moving, is important to produce a quality slit edge with minimum burr.

Mounted on fixed base 70 are four posts 90 on which rides a top plate 92 on four bushings 94. The vertical clearance or overlap between knives 60 and 18 may be varied by screw 96 and a calibrated dial handle 98, which operate to change the distance between the top plate 92 and the base 70. As with the horizontal adjustment, this adjustment helps the minimize the burr on the trimmed edge and may be made while the strip is moving. The top plate 92 may also be raised by this means to completely open the knives for threading if desired.

The clearance between 16 and 18 and between 60 and 62 is only very slightly greater than the strip thickness. If rubber covered backup rolls are used, the clearance may be zero or even slightly negative. This close clearance helps to hold the strip flat and to achieve accurate width and good edge quality.

Referring the FIGS. 3 and 4, the upper end of each chute 26 has a complex configuration designed to mate closely with the associated cutting assembly. The chute 26 is positioned close to the cutting assembly at the point where the trimmed scrap 24 separates from the trimmed strip 20. The chute is shaped so that portions of the end of the chute positioned close to the cutting assembly are cut away in order to allow clearance for the knives and rollers. The cuts 102, 102 are made so as to conform to the shape of the element of the cutting assembly that the cut side is adjacent. The chute, together with the knives and backup rolls of the associated cutting assembly, enclose the trimmed scrap 24. The feature together with the aforementioned downward angle of inclination of the chute results in a scrap disposal system that is self-threading even when there are breaks in the trim. The chute has a circular cross section throughout its length to avoid the problem of scrap catching on its interior surface.

The overall length of the scrap chute should be kept as short as possible, preferably under one foot. The chutes are securely clamped to the cutting assemblies and thus move in and out with the movable assembly as strip width is changed. The chutes are preferably made of hardened steel and are smooth on the inside.

In view of the foregoing, it may be seen that several objects of the present invention ave been achieved and other advantageous results attained.

As various changes could be made in the above preferred embodiment without departing from the scope of the invention, it should be understood that all matter contained in the above description or shown in the accompanying drawings shall be interpreted as illustrative and not in a limiting sense.

What is claimed is:

1. A system for trimming the edges of a metal strip and disposing of the edge trimmings comprising:

a cutting assembly having two parallel rotary cutting knives, one positioned mainly below the strip to be cut and one positioned mainly above the strip to be cut, each rotary knife having an adjacent backup roll mounted on the same central axis, the backup roll, adjacent the knife located mainly below the strip, being positioned on the side of the knife furthest from the center of the strip and the backup roll, adjacent the knife located mainly above the strip, being positioned on the side of the knife closes to the center of the strip;

a one-piece, straight, tubular chute having a constant cornerless cross-section through which trimmings pass from said cutting assembly to a chopping device, the end of said chute adjacent said cutting assembly being configured so that said chute end abuts said cutting assembly and together with said cutting assembly encloses said edge trimmings;

chopping means through which trimmings from said chute means pass and are severed into small lengths;

means for attaching the chutes to the cutting assembly;

means for driving said trimmer; and means for driving said chopping means.

2. The system according to claim 1 wherein said chute has a circular cross section along its entire length.

3. The system of claim 1 wherein the angle of the chute with respect to said strip is substantially the same as that of said edge trimmings so that said tubular chute is self-threading.

4. The system of claim 3 wherein said angle is about 15 to 30 degrees.

5. The system of claim 1 wherein a means is provided for adjusting the lateral position of said cutting assembly of said edge trimmer with respect to the centerline of said strip while said strip is moving through said trimmer to provide an on-the-fly adjustment in the width of the strip thus trimmed.

6. The system of claim 1 wherein said adjusting means comprises:

a pair of spring-loaded guide rolls located on opposite edges of said strip, said guide rolls keeping said strip centered as it approaches said trimmer and as it moves away from said trimmer, each of said guide rolls being displaced by an equal distance, a mechanism for moving the cutting assembly of said trimmer so that the distance between said cutting assembly and the centerline of said strip can be increased or decreased.

7. The system according to claim 1 wherein said chopping means comprises a pair of opposed, coacting rolls that rotate in opposite directions, one of said rolls aving a blade mounted laterally on its outer surface to effect said chopping against the outer surface of the other of said rolls.

8. The system of claim 1 wherein a means is provided for adjusting said cutting assembly of said edge trimmer to accommodate strips of varying thicknesses.

9. The system of claim 8 wherein said adjusting means comprises a mechanism for changing the vertical distance between the knives of said cutting assembly.

10. The system of claim 1 wherein a means is provided for changing the horizontal distance between said knives of said cutting assembly of said edge trimmer in order to control the burr resulting from the cutting process.

11. The system according to claim 1 further comprising a second cutting assembly which is a mirror image of said cutting assembly and coacting therewith to provide a twin-edge trimmer.

12. The system according to claim 11 further comprising means for centering said strip relative to said two cutting assemblies of said twin edge trimmer.

13. The system according to claim 12 wherein said centering means comprises:

a pair of spring-loaded guide rolls located on opposite edges of said strip, said guide rolls keeping said strip centered as it approaches said trimmer and as it moves away from said trimmer, each of said pair of guide rolls being displaced by an equal distance.

* * * * *